United States Patent
Lotspiech (10) Patent No.: US 7,975,313 B2
(45) Date of Patent: *Jul. 5, 2011

(54) SYSTEM AND METHOD FOR TRACING TARDOS FINGERPRINT CODES

(75) Inventor: Jeffrey Bruce Lotspiech, Henderson, NV (US)

(73) Assignee: International Business Machines Corporation, Armonk, NY (US)

( * ) Notice: Subject to any disclaimer, the term of this patent is extended or adjusted under 35 U.S.C. 154(b) by 994 days.

This patent is subject to a terminal disclaimer.

(21) Appl. No.: 11/838,835

(22) Filed: Aug. 14, 2007

(65) Prior Publication Data

US 2009/0049558 A1    Feb. 19, 2009

(51) Int. Cl.
*G06F 7/04* (2006.01)
*G06F 17/30* (2006.01)
*H04N 7/16* (2006.01)
*H04N 7/167* (2006.01)

(52) U.S. Cl. .......... 726/32; 380/200; 380/201; 380/202; 726/26

(58) Field of Classification Search ................. 380/200, 380/201, 202; 726/26, 32
See application file for complete search history.

(56) References Cited

U.S. PATENT DOCUMENTS

| | | | |
|---|---|---|---|
| 5,349,655 A * | 9/1994 | Mann | 714/6 |
| 5,408,642 A * | 4/1995 | Mann | 714/38 |
| 6,076,165 A * | 6/2000 | Maenza | 726/29 |
| 7,082,537 B2 | 7/2006 | Muratani | |
| 2002/0133701 A1 | 9/2002 | Lotspiech et al. | |
| 2003/0220921 A1 | 11/2003 | Fagin et al. | |
| 2004/0098593 A1 | 5/2004 | Muratani | |
| 2004/0153941 A1 | 8/2004 | Muratani | |
| 2006/0056695 A1 | 3/2006 | Wu et al. | |
| 2006/0085343 A1 | 4/2006 | Lisanke et al. | |
| 2006/0239503 A1 | 10/2006 | Petrovic et al. | |
| 2006/0259783 A1 * | 11/2006 | Work et al. | 713/189 |
| 2006/0282676 A1 | 12/2006 | Serret-Avila et al. | |
| 2007/0067242 A1 | 3/2007 | Lotspiech et al. | |
| 2007/0180537 A1 * | 8/2007 | He et al. | 726/32 |

OTHER PUBLICATIONS arXiv:cs/0607131v1 Tardos fingerprinting is better than we thought B. Skoric, T.U. Vladimirova, M. Celik, J.C. Talstra Jul. 27, 2006.*

(Continued)

*Primary Examiner* — Farid Homayounmehr
*Assistant Examiner* — Benjamin A Kaplan
(74) *Attorney, Agent, or Firm* — Donald L. Wenskay; Mohammed Kashef (57) ABSTRACT

A system and method is provided for identifying the source of an unauthorized copy of content. The method includes embedding a unique user fingerprint code to into each of a plurality of authorized copies of content and identifying an unknown fingerprint code in an unauthorized copy of the content. Each member of the unknown fingerprint code is compared to each corresponding member in each of the user fingerprint codes. A score is assigned to each of the user fingerprint codes based on the comparison and users associated with scores exceeding a threshold are identified as a source of the unauthorized copy.

1 Claim, 4 Drawing Sheets

OTHER PUBLICATIONS

Boneh et al., "Fully collusion resistant traitor tracing with short ciphertexts and private keys", Eurocrypt '06, 2006, http://citeseer.ist.psu.edu./boneh06fully.html.

Hagiwara et al., "A short random fingerprinting code against a small number of pirates", Applied Algebra, Algebraic Algorithms and Error-Correcting Codes. 16th International Symposium, AAECC-16. Proceedings (Lecture Notes in Computer Science vol. 3857) pp. 193-202 (Feb. 20-24, 2006).

Seol, et al., "A scalable fingerprinting scheme for tracing traitors/colluders in large scale contents distribution environments", Intelligent Systems Design and Applications, 2005. ISDA '05. Proceedings. 5th International Conference Sep. 8-10, 2005 pp. 228-233.

Celik et al., "Collusion-resilient fingerprinting using random prewarping" Image Processing, 2003. ICIP 2003. Proceedings. 2003 International Conference vol. 1, Sep. 14-17, 2003 p. I-509-12 vol. 1.

Tardos, G, "Optimal probabilistic fingerprint codes" Proceedings of the 35th Annual ACM Symposium on Theory of Computing, 2003, pp. 116-125.

* cited by examiner

FIG. 1

| | 200 |
|---|---|
| Code on Unauthorized Content | 1 0 1 1 1 0 1 0 0 0 1 0 1 1 |
| Code for User 1 | 1 0 1 0 1 0 1 0 1 0 0 0 1 1 |
| Code for User 2 | 1 0 1 1 1 0 1 0 0 0 0 1 1 1 |
| ⋮ | ⋮ |
| Code for User N | 1 0 1 1 1 0 1 0 1 0 0 1 0 1 1 |

SYSTEM AND METHOD FOR TRACING TARDOS FINGERPRINT CODES

FIELD OF INVENTION

The present invention generally relates to systems and methods for protecting digital content from unauthorized use, and particularly to systems and methods for detecting sources of unauthorized copies of digital content.

BACKGROUND

There is an increasing use of global distribution systems such as the Internet for distribution of digital assets including music, film, computer programs, photographs, games and other content. There is also a concurrent increase in the unauthorized copying, or pirating, of digital content causing considerable economic losses to content providers. Effective countermeasures are important to the viability of businesses engaged in the distribution of digital media.

Many types of countermeasures have been developed to prevent or deter the creation and distribution of unauthorized copies of digital media. Some countermeasures, such as encryption, are directed at preventing pirating in the first place, while others try to locate the source of the unauthorized copies. For example, technologies such as digital watermarking and traitor tracing are directed to finding the sources of unauthorized copies. Digital watermarking involves the addition of a unique mark on each copy of distributed digital content. If an unauthorized copy of the watermarked content is found the watermark may be used to identify the pirate.

In general, a digital watermark may be a pseudo-noise pattern representing the identity of the user, which is superimposed on the content to be distributed. Later, when an unauthorized copy is found, the presence of a particular watermark pattern should reveal the identity of the traitor who has compromised the content. A pirate, knowing the existence of the watermark, may attempt to erase the watermark from a copy before distributing illegal copies. To prevent the erasure of watermarks, content providers may distribute the digits of the watermark into locations in the content that are unknown to the user and which are not needed for the intended use of the content. Without knowledge of the location of the watermarks, attempts to erase the watermark may result in the altering of non-watermark bits and possibly rendering the content unusable.

One way that pirates attempt to remove digital watermarks that are located in unknown locations is by colluding attacks, where multiple watermarked copies of content are compared to find locations where they differ. The pirates may then assume that the watermark is located in these positions and erase or replace the bits in these positions. If successful, the result may be the generation of an unauthorized copy that is still usable because the bits needed to operate the content have not been altered, but which no longer contain a meaningful watermark that can be used to find the source of the unauthorized copy. Once such an unauthorized copy of unwatermarked content is made available, virtually unlimited copies may be distributed resulting in serious economic harm to the content owner and distributors.

The design of effective watermarking systems requires a proper balance between a number of factors, including the imperceptibility of the watermark to the user so that the content is not degraded, the ability of the watermark to maintain its integrity under various noise and distortion conditions, the security of the watermark against manipulation or erasure, computational costs in the watermark embedding and extraction process, and the probability of errors. Errors may include false accusations that a legitimate user is a pirate or the inability to detect a colluding attacker.

Given the ability of pirates to use collusion attacks to remove digital watermarks, various methods and systems have been proposed and developed to create digital watermarks that are difficult to alter. Also, methods and systems have been proposed and developed to analyze altered watermarks found in unauthorized copies to detect at least one of the sources. One such technique for digital watermarking has been proposed by Gabor Tardos in "Optimal Probabilistic Fingerprint Codes" in *Proceedings of the Symposium on the Theory of Computing (STOC)* '03, pages 116-125, 2003, the contents of which are incorporated herein by reference. In this reference (hereinafter referred to as "Tardos"), a digital watermark called a "fingerprint code" is proposed, where individual users are given equivalent copies of content that have slight variations assigned according to a fingerprint code. If a pirate copy of the content is later obtained, it should be possible to detect at least one of the users who leaked the pirate copy, even if multiple users have colluded to construct a pirate copy by mixing the different variations that they have.

The Tardos fingerprint code technique assumes that when a group of colluding attackers analyze multiple copies of the same content and find only a single symbol at a given position in the code, then the attacker will insert that symbol in the code. However, if the attackers observe more than one symbol at a given position in the different copies of the content, they might insert any symbol, including an unreadable symbol, or a symbol they have not seen in the copies. These assumptions are applicable for content protection of things like text documents and software where it is very difficult for the attackers to guess the precise points of variation. In such content once a particular point of variation is identified, it is easy for the attacker guess what all the variations might be. Because attackers have this capability, a binary code is the most reasonable fingerprint code to use for text documents and software.

The fingerprint code as disclosed in Tardos has a length that is proportional to the square of the number of colluding attackers that could be detected. This was a significant improvement over the previous state of the art. Reducing code length is important because longer code lengths impose greater computational and memory burden on systems processing the content. Also, a larger code length may increase the perceptibility of the code and may degrade the quality of the content to the user.

In contrast, there is another set of assumptions that leads to a different type of code, called a "tracing traitors" code. In a tracing traitors code, the attackers are assumed to only be able to generate a symbol they have seen among the copies. This is a reasonable assumption for content like movies and audio, where the variations might be multiple seconds long. One example of a tracing traitors code is used in the Advanced Access Content System used on DVDs. However, fingerprint codes, such as the Tardos fingerprint code, may also be useful with movies if the variations are very small, such as the case where the individual pixels are the points of variation. Another example is the tracing technology defined by the Self-Protecting Digital Content (SPDC) system of Cryptographic Research Incorporated, which implies a fingerprint code.

Accordingly, there is a need for systems and methods for reducing the pirating of digital content by determining the source of unlawful copies. There is also a need for such systems and methods which have reduced fingerprint code length, so that they do no impose undue memory and computational costs, do not degrade the quality of the content and do not increase the perceptibility of the code to the user. In addition, there is a need for such systems and methods which have fingerprint codes which maintain their integrity under various noise and distortion conditions, are secure against manipulation or erasure, and which have a low probability of error.

SUMMARY OF THE INVENTION

To overcome the limitations in the prior art briefly described above, the present invention provides a method, computer program product, and system for tracing Tardos fingerprint codes.

In one embodiment of the present invention a method for identifying the source of an unauthorized copy of content comprises: embedding a unique user fingerprint code to into each of a plurality of authorized copies of content; identifying an unknown fingerprint code in an unauthorized copy of the content; comparing each member of the unknown fingerprint code to each corresponding member in each of the user fingerprint codes; assigning a score to each of the user fingerprint codes based on the comparison; determining which of the scores exceeds a threshold; and identifying as a source of the unauthorized copy at least one user fingerprint code having the score determined to exceed the threshold.

In another embodiment of the present invention, a computer implemented method for tracing a fingerprint codeword comprises: calculating a score for a fingerprint codeword; calculating a threshold; if the score is greater than 1.33 times the threshold, labeling the fingerprint codeword a traitor; and if the score is less that or equal to 1.33 times the threshold, labeling the fingerprint codeword as innocent.

In a further embodiment of the present invention a system for identifying the source of an asset comprises: embedding unit for inserting a known identifier into electronic files; and detecting unit for detecting the known identifier in the electronic files, wherein the detecting unit comprises: a comparing component for comparing each element of the identifier in an electronic file of a copy of the asset without a known identifier to each element of known versions of the identifier; a scoring component for assigning a score to each of the user fingerprint codes based on the comparison; determining component for determining which of the scores exceeds a threshold; and identifying component for identifying as a source of the unauthorized copy at least one user fingerprint code having the score determined to exceed the threshold.

In an additional embodiment of the present invention, an article of manufacture for use in a computer system tangibly embodying computer instructions executable by the computer system to perform process steps for tracing a digital watermark, the process steps comprises: embedding a Tardos user fingerprint code to into each of a plurality of authorized copies of content; identifying an unknown user fingerprint code in an unauthorized copy of the content; comparing each member of the unknown fingerprint code to each corresponding member in each of the Tardos user fingerprint codes; assigning a score to each of the Tardos user fingerprint codes based on the comparison; determining which of the scores exceeds a threshold; and identifying as a source of the unauthorized copy at least one Tardos user fingerprint code having the score determined to exceed the threshold.

Various advantages and features of novelty, which characterize the present invention, are pointed out with particularity in the claims annexed hereto and form a part hereof. However, for a better understanding of the invention and its advantages, reference should be make to the accompanying descriptive matter together with the corresponding drawings which form a further part hereof, in which there is described and illustrated specific examples in accordance with the present invention.

BRIEF DESCRIPTION OF THE DRAWINGS

The present invention is described in conjunction with the appended drawings, where like reference numbers denote the same element throughout the set of drawings.

DETAILED DESCRIPTION OF THE INVENTION

The present invention overcomes the problems associated with the prior art by teaching a system, computer program product, and method for performing tracing of pirates of digital content containing a fingerprint code. In the following detailed description, numerous specific details are set forth in order to provide a thorough understanding of the present invention. Those skilled in the art will recognize, however, that the teachings contained herein may be applied to other embodiments and that the present invention may be practiced apart from these specific details. Accordingly, the present invention should not be limited to the embodiments shown, but is to be accorded the widest scope consistent with the principles and features described and claimed herein. The following description is presented to enable one of ordinary skill in the art to make and use the present invention and is provided in the context of a patent application and its requirements.

The various elements and embodiments of invention can take the form of an entirely hardware embodiment, an entirely software embodiment or an embodiment containing both hardware and software elements. Elements of the invention that are implemented in software may include but are not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Although the present invention is described in a particular hardware embodiment, those of ordinary skill in the art will recognize and appreciate that this is meant to be illustrative and not restrictive of the present invention. Those of ordinary skill in the art will further appreciate that a wide range of computers and computing system configurations can be used to support the methods of the present invention, including, for example, configurations encompassing multiple systems, the internet, and distributed networks. Accordingly, the teachings contained herein should be viewed as highly "scalable", meaning that they are adaptable to implementation on one, or several thousand, computer systems.

Figure 1:
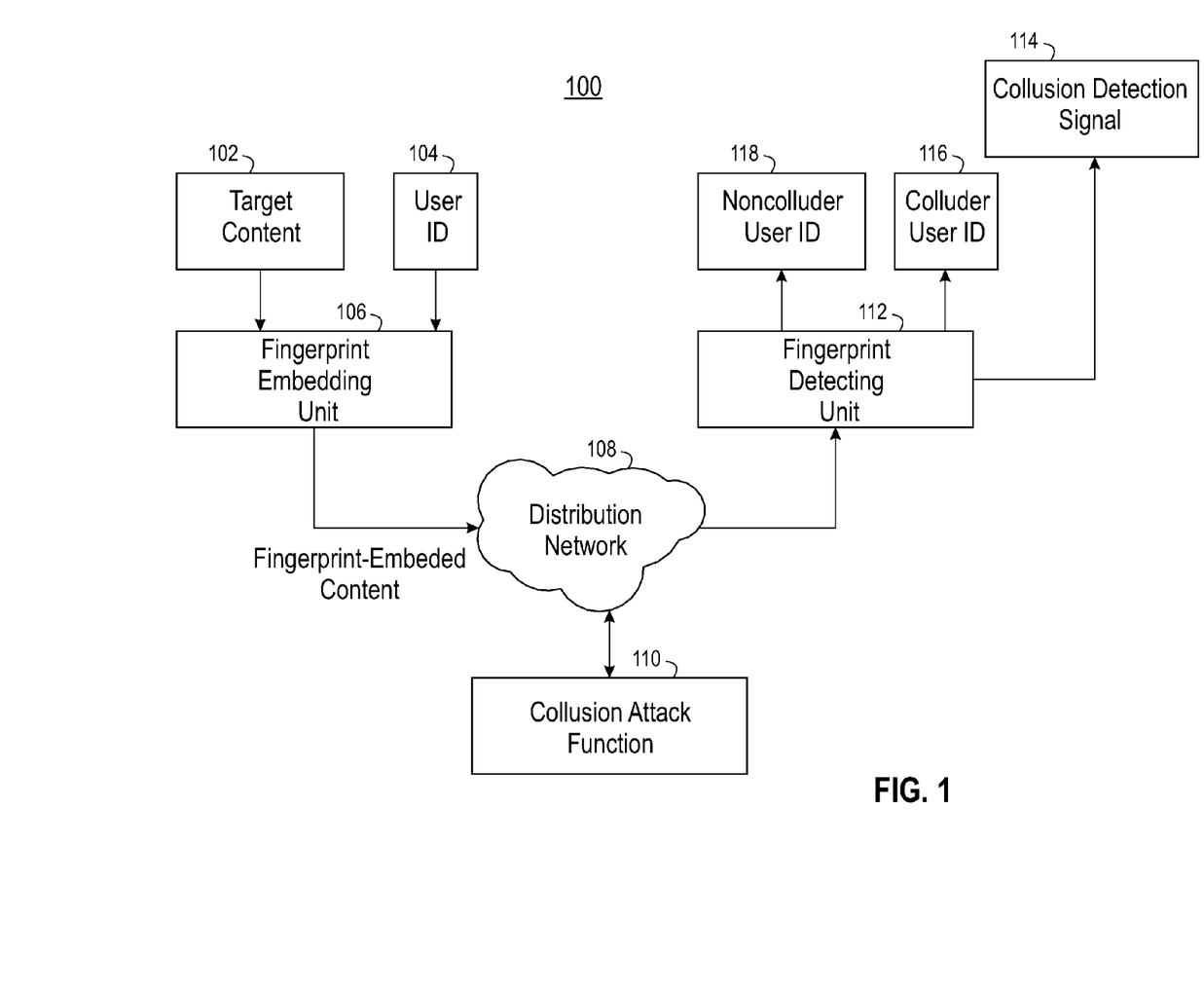
FIG. 1 is a conceptual view of the schematic structure of a fingerprint code tracing system in accordance with one embodiment of the invention.

FIG. 1 is a conceptual view of the schematic structure of a fingerprinting system 100 in accordance with one embodiment of the invention. Target content 102 may comprise for example, an image, movie, audio, text or software. A user identification (ID) number 104 is inputted along with the target contents 102 to a fingerprint embedding unit 106. Code embedded contents are generated by the fingerprint embedding unit 106 and distributed though a distribution network 108, which may include a storage medium which stores the code embedded contents and may include a communications network such as the Internet.

A collusion attack 110 as described previously may be made on the code-embedded contents after they have entered the distribution network 108. In this case, the attackers would have merged one or more code-embedded elements so that the fingerprint in the resulting content would not correspond to a single user ID 104. To resist this kind of collusion attack, a fingerprint detecting unit 112 based on the present invention generates a collusion attack determination signal 114 indicating the presence or absence of a collusion attack, a colluder ID 116 (a user ID of one of the attackers in the collusion), and a non-colluder user ID 118 in cases where a user ID is not associated with a collusion attack.

The fingerprinting system 100 may be implemented in various ways with various kinds of content. For example, the target contents 102 may be software sold by a software vendor, which may use the fingerprint embedding unit 106 to embed a fingerprint into the software before delivering it to a customer. The customer may receive the software through the distribution network, which may include the delivery of the software on a disc or transmission of the software over the Internet. In another embodiment, the target contents 102 may include a movie on a DVD and the fingerprint embedding unit 106 may comprise the purchaser's DVD player. In this case, the DVD player inserts a unique code identifying the particular DVD player into the data containing the movie that comprises the output signal that may be fed to a television.

Target content 102, in whatever form, may be the subject of a collusion attack 110 which alters the fingerprint. The target content may then be distributed in the distribution network in an unauthorized form without a recognizable fingerprint that can be easily associated with any known user. For example, where the target content 102 is software purchased from a software vendor, a plurality of colluders may acquire multiple legitimate copies of the software, each having different fingerprints. Where the target content 102 is a DVD, the attackers may acquire multiple DVD players and analyze the output containing the fingerprints from each DVD player.

The colluding attackers then may compare the data in the different copies and attempt to locate bits where the data is different among the different copies. Colluding attackers may make the assumption that these locations where the bits differ are the locations of the fingerprint. The attackers may then insert different data at these locations. In some cases the attackers may insert the data found in the majority of fingerprint codes into each given fingerprint position. A fingerprint detecting unit 112 receives the modified content from the distribution network 108 and uses the teachings of the present invention to determine if the fingerprint has been altered by a collusion attack, and if so, determine at least one of the sources of the collusion attack. In particular, the generated colluder ID 116 will correspond to at least one of the versions of the contents used by the attackers having a known user ID 104. In the previously mentioned case where the target content 102 is purchased software, for example, the identity of the purchaser may be determined from the colluder ID 116. Where the target content 102 is a movie on a DVD, the user ID of a DVD player may be determined from the colluder ID 116. In some cases the purchaser of the particular DVD player that generated the fingerprint may be traced from the colluder ID 116.

Figure 2:
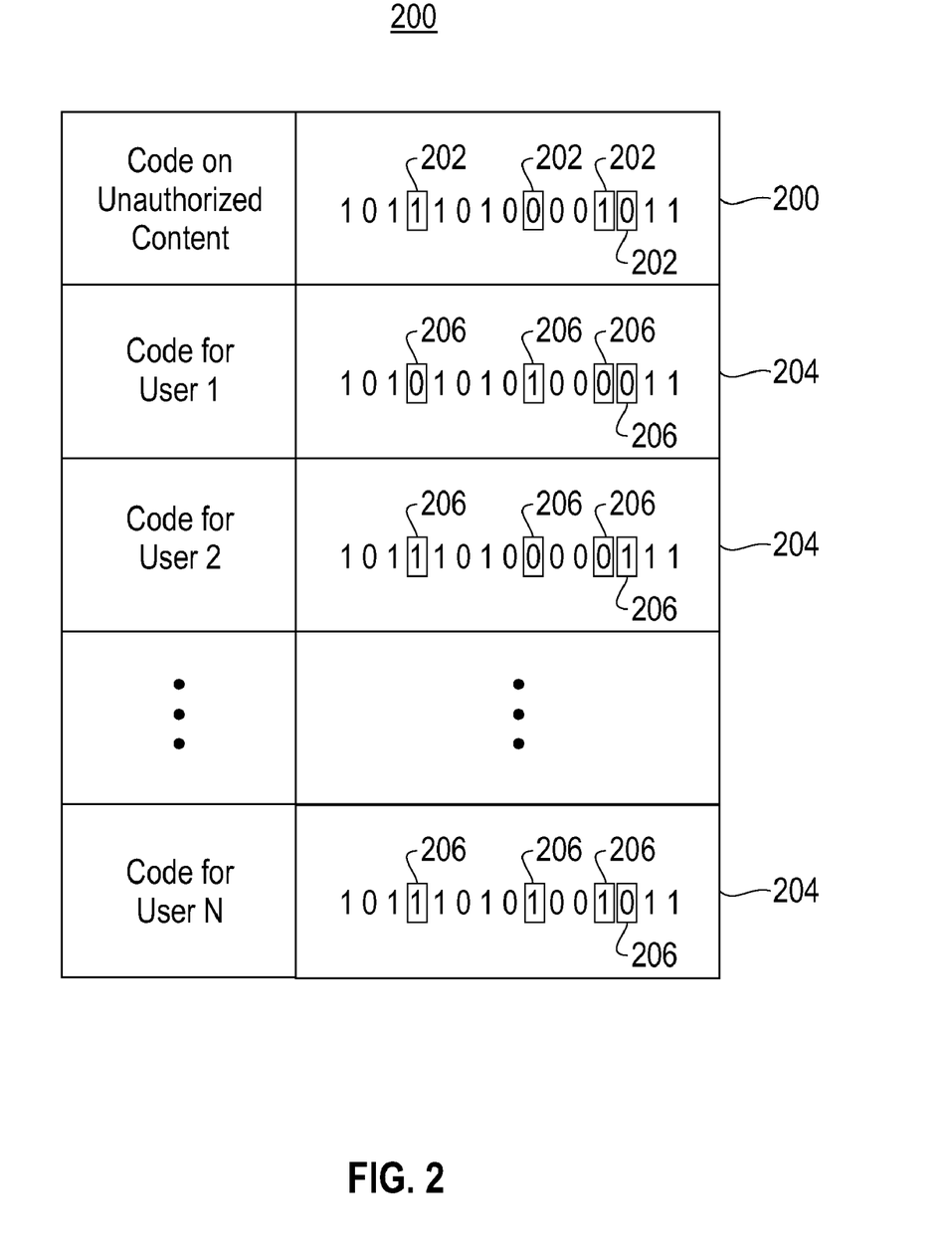
FIG. 2 is an illustration of an exemplary fingerprint code embedded into a set of binary data in accordance with an embodiment of the present invention.

FIG. 2 is an illustration of an exemplary fingerprint code embedded into a set of binary data. The top row shows a portion of a bit stream of content data 200 representing digital content which has had a fingerprint code 202 embedded into the columns indicated by boxes. The bits corresponding to the fingerprint code, may serve no purpose other than to represent the fingerprint code, while the columns without boxes contain the data used to store the content, which may be software, text, a movie, etc.

In particular, the top row in FIG. 2 contains the content fingerprint codeword 200 of suspected unauthorized content, with individual fingerprint variations 202. The fingerprint codeword 200 may not match any known fingerprint codewords assigned previously by the content owner. It may be assumed that this content fingerprint codeword 200 was generated by a collusion attack. Each subsequent row contains known content fingerprint codeword 204 for N known users each having known individual fingerprint variations 206 imbedded therein. Known content fingerprint codeword 204 may be substantially identical to the content fingerprint codeword 200. While the copies of known content fingerprint codeword 204 will be identical, it will be appreciated that the suspect content fingerprint codeword 200 may have some differences because the attackers may not have been able to correctly distinguish each fingerprint code data column and may have inserted different bits or variations into codeword columns.

Note that in the FIG. 2 the fingerprint codes are represented as binary strings for clarity of explanation. In many cases, the actual fingerprint data inserted into the digital content data would not actually be binary 1s and 0s. For example, in the case of fingerprinted software, suppose there was an instruction in the program which zeroed a register. In some versions of the software, that zeroing might be accomplished by XORing the register value to itself; in other versions of the software, this zeroing might be accomplished by subtracting the register value with itself. This difference would be an example of variation 206 in FIG. 2. One of these variations would be arbitrarily labeled variation '0' and the other variation would be labeled '1'. There would be many more variations in the program that would be treated similarly. The sum total of these variations would be the fingerprint codeword 204. Rather than showing the actual content variations, FIG. 2 summarizes them as '1's or '0's.

In accordance with an embodiment of the present invention, the methods and systems of the invention will be used to analyze the fingerprint codeword 200 by comparing it to each known user fingerprint codeword 204 to determine which known users were the sources of the suspect content. Of course, if the suspect fingerprint codeword 200 were an exact match with a known fingerprint codeword 204, it would be immediately apparent after a simple comparison of the two. The techniques of the present invention are directed to the more challenging situation where the suspect fingerprint codeword 200 does not match any known fingerprint codeword 204.

In accordance with embodiments of the present invention, the fingerprint variations are embedded into the content by a fingerprint code embedding unit 106 as shown in FIG. 1, which may use a technique for code assignment taught by Tardos, which has been previously incorporated by reference. In accordance with the Tardos code assignment technique, a probability $p_i$ is assigned to each column (each fingerprint variation) in the fingerprint code, which is the probability that a given user will be assigned variation '1' in that column. This knowledge of $p_i$ for each assigned fingerprint code may then be exploited in a tracing method to determine the source of an unauthorized copy of content, as described in detail below.

In general, the tracing method of an embodiment of the invention is similar to the tracing method of Tardos, with some important modifications. In particular, the tracing method of the present invention employs a scoring technique that assigns a score to each possible known user fingerprint codeword. Where the score of a fingerprint codeword exceeds a predetermined threshold, the user associated with that fingerprint codeword is identified as a traitor. In accordance with the present invention, the present inventors have recognized that the Tardos tracing technique did not use the variations '0's in the attacker fingerprint codeword 200. The present inventors have also recognized that '0's may be used to reveal information about the attacker. In contrast, in Tardos the '1's, but not the '0's, in the attacker's fingerprint codeword were used in the scoring calculations.

In particular, in accordance with embodiments of the present invention, each user is assigned a score as follows: for each '1' in the attacker's fingerprint codeword, the user's score is incremented by $sqrt((1-p_i)/p_i)$ if the user's fingerprint codeword also has a '1' in that position. However, if the user's fingerprint codeword has a '0' at that position, the user's score is decremented by $sqrt(p_i/(1-p_i))$. In accordance with the present invention, the above techniques taught by Tardos, are modified by the following discussion, In particular, for each '0' in the attacker's fingerprint codeword, if the user's fingerprint codeword also has a '0' at that position, the user's score is incremented by $sqrt(p_i/(1-p_i))$. However, if the user's fingerprint codeword has a '1' at that position, the user's score is decremented by $sqrt((1-p_i)/p_i)$.

Using this improved scoring, the average score of innocent users will still be zero, as it is in Tardos. However, the average of the score of guilty users will be doubled compared to the prior art. After all the users have been scored, the scores are compared against a threshold. Those users whose scores are above the threshold are accused.

As a result, in some embodiments of the present invention, shorter fingerprint codes may be used than in Tardos with accuracy equivalent to Tardos. In other embodiments of the present invention, increased accuracy over Tardos may result when fingerprint codes of the same length are used. In still other embodiments of the invention, some combination of increased accuracy and smaller fingerprint codes may result depending on the length of the fingerprint code used.

Figure 3:
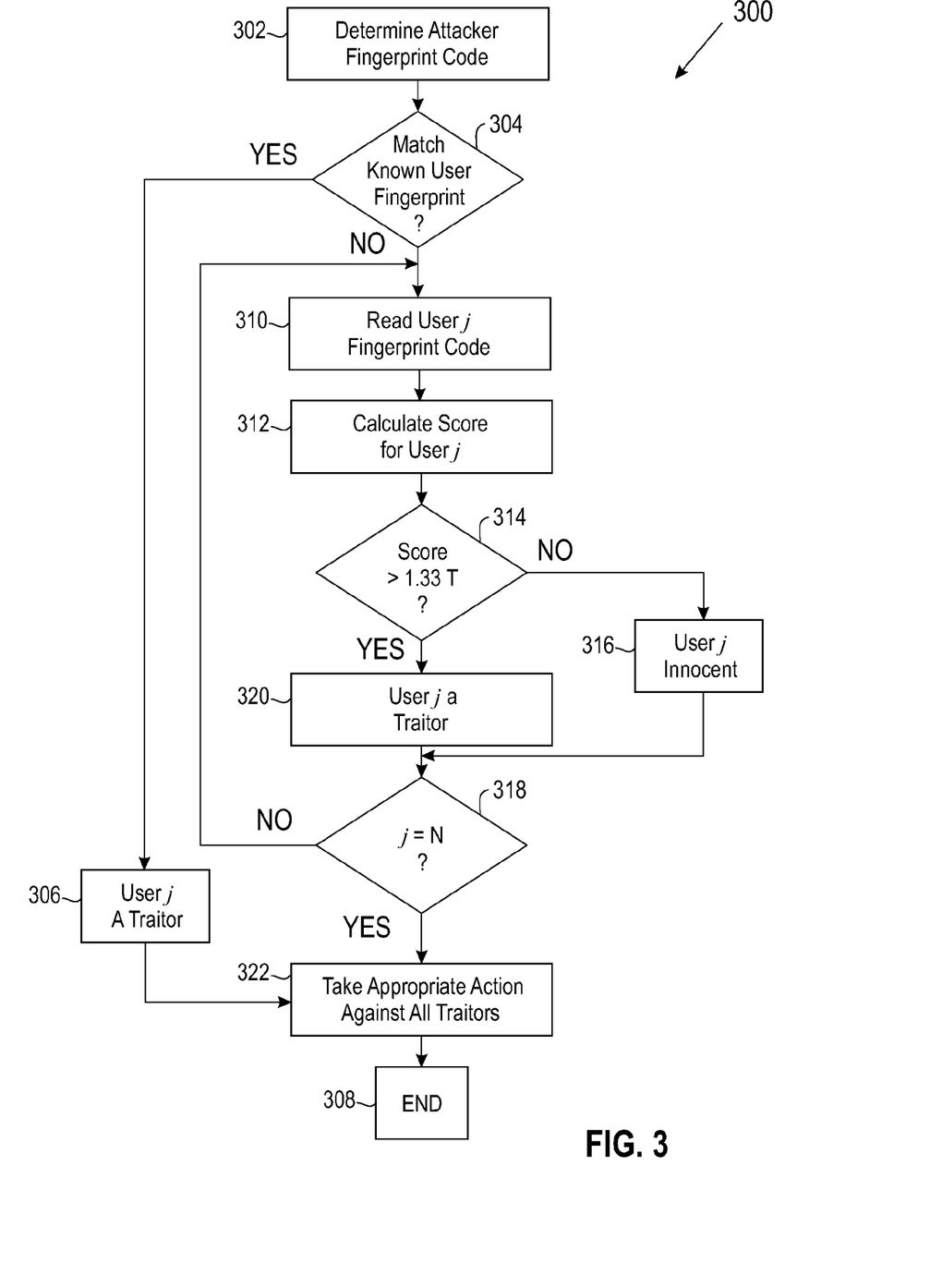
FIG. 3 is a flowchart illustrating the steps performed by the fingerprint code tracing system shown in FIG. 1 for performing fingerprint code tracing in accordance with an embodiment of the invention.

Referring now to FIG. 3, a flow chart is shown of a process 300 of tracing the source of unauthorized content generated by a collusion attack in accordance with one embodiment of the present invention. The process 300 starts at step 302, where an unauthorized copy of content is acquired and the attacker fingerprint code is determined by looking at the appropriate columns in the content. Using the example shown in FIG. 2, the attacker fingerprint variation 202 may be derived from the appropriate position in an unauthorized copy of content 200. An initial search determines if there is an exact match between the attacker fingerprint codeword and any known fingerprint codewords, in step 304. If there is an exact match, the matching user is identified as a traitor in step 306 and appropriate action taken in step 322, whereupon the process 300 ends at step 308. If instead, step 302 did not find a matching known fingerprint codeword, then the process moves to step 310 and the known fingerprint codeword ($c_j$) of a first user j is read, where the total number of users is N. In the example shown in FIG. 2, this step may involve reading the known fingerprint codeword 204 of a user.

In step 312, a score for user j is calculated. In accordance with one embodiment of the invention, this calculation is performed according to the process 400 shown in FIG. 4 and described below. In step 312 a determination is made of whether the score of user j is greater than 1.33 times a threshold T. One way to calculate threshold T is according to the technique taught in Tardos. In particular, in Tardos, a threshold (called "Z" in Tardos) may be defined as T=20 ck, where c is the maximum number of colluding attackers the code is designed for and k=[log(1/ϵ)], where ϵ is a measure of how secure the fingerprint code is against coalitions of size c. In fact, ϵ is the probability that the code might make an error, and is a design choice of the system using the code. There are two types of errors: and innocent user might be falsely incriminated, or no guilty user might be found. In both cases, the probability is ϵ.

The threshold T is multiplied by 1.33 for the following reason. As described above, the tracing process of the present invention differs from Tardos by using the '0's and '1's in the attacker's fingerprint code and not just the '1's as in Tardos. Because the number of '0's in the Tardos fingerprint code is roughly equal to the number of ones, this roughly doubles the scores of guilty users as compared to Tardos. The innocent users' scores, on the other hand, continue to average zero. However, if the standard deviation of the innocent users were also to double, the tracing technique of the invention process would no be useful: the threshold would also have to double so that innocent users would be no more likely to be falsely incriminated. Fortunately, this is not true; the standard deviation of innocent users increases only by about ⅓, so the threshold is increased only by ⅓. Thus, with guilty scores doubled but the threshold only ⅓ higher, a code only ⅔ long suffices, which is one of the advantages of the present invention.

Referring again to FIG. 3, if step 314 determined that the score for user j is no greater than 1.33T, the process 300 will conclude that user j is innocent in step 316. The process 300 will then move to step 318 which determines if all the N number of users have been scored. If not, the process 300 will move back to step 310 and the fingerprint codeword of the next user j+1 will be read.

If step 314 determined that the score for user j was above 1.33T, step 320 will declare that user j is a traitor. Step 318 will then determine if all the users have been scored. If they have, then step 322 will take appropriate action against all users identified as traitors in step 320. The appropriate action will depend on the particular application. For example, if the content is purchased software and the identity of the user is known from the purchase transaction, legal action for violating licensing terms and for copyright infringement against the user may be initiated. Also, in some situations, where the software is connected to the internet, a command may be sent to the software disabling it. In the case where the content is a DVD, the owner of the DVD player might be traced and legal action initiated against them. In cases where it is not possible to locate the DVD owner, future DVDs may include codes that will prevent them from playing on the traitor DVD players. At this point the process ends at step 308.

Figure 4:
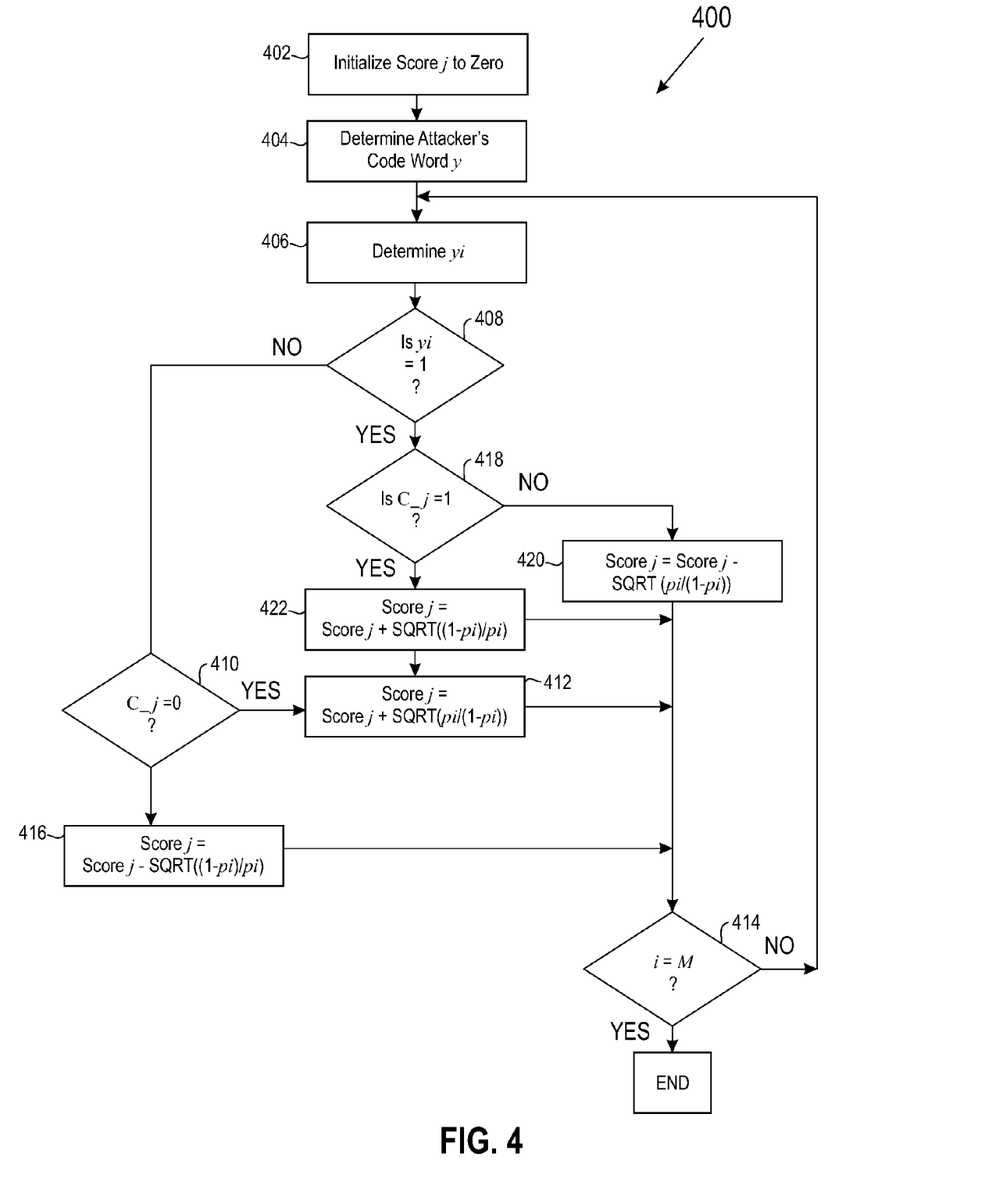
FIG. 4 is a flowchart illustrating the steps performed in the score calculating step shown in FIG. 3 in accordance with an embodiment of the invention.

FIG. 4 shows a flowchart of a process 400 for calculating the score of user j in step 312 in accordance with one embodiment of the invention. Process 400 starts with step 402, which initializes the score of user j to zero. In step 404 the suspected attacker's fingerprint codeword is determined. Attacker's fingerprint codeword may be a binary vector y having M binary bits found in unauthorized content, such as the suspect fingerprint code 202 shown in FIG. 2. In step 406 the $i^{th}$ position of the attacker's fingerprint codeword, $y_i$, is determined. Step 408 determines if $y_i$ is equal to '1' and if it is, step 410 determines if the $i^{th}$ position of the user j fingerprint codeword $c_j$ is a '0'. If it is a '0', step 412 will assign a score to user j equal to the user j's current score (in this example, zero), plus $sqrt(p_i/(1-p_i))$, where, as defined previously, $p_i$ is the probability that a given user will be assigned a '1' in that position (the $i^{th}$ position) of the fingerprint codeword. The process 400 then determined in step 414 if all M variations of the user j's fingerprint codeword have been compared to corresponding variations of the attacker's fingerprint codeword. If so, the process 400 ends because the score for user j is complete and the process moves to step 314 of process 300 in FIG. 3.

If step 410, instead of finding that $c_j$ was '1', as described above, found that $c_j$ was not '0' (that is, a '1'), process 400 will move from step 410 to step 416, which will assign a score to user j equal to score [j] (the user j's score up to that point, which in this example is zero) minus $sqrt((1-p_i)/p_i)$. The process then moves to step 414 to determine if all M positions in vector y have been processed. If not, the process moves to step 406 to process the next $i^{th}$ position.

Returning again to step 408, if instead it is determined in step 408 that $y_i$ is a '1', then the process 400 moves from to step 418, where it is determined if the user j's fingerprint codeword at the $i^{th}$ position $c_j$ also has a '1' at that position. If it does not, step 420 then decrements the user j's score to be equal to score [j] (the user j's score up to that point) minus $sqrt(p_i/(1-p_i))$. The process then moves to step 414, described above.

If step 418 had determined that the user j's fingerprint codeword at the $i^{th}$ position did have a '1', then the process moves to step 422 and user $j_i$'s score is incremented to be equal to score [j] (the user j's score up to that point) plus $sqrt((1-p_i)/p_i)$. The process 400 will then move to step 414 and then to step 406 until the scoring of user j is complete and the process 400 will then move to step 314 in FIG. 3.

The system and method for tracing Tardos fingerprint codes of the present invention results in a significant reduction in the length of the code. It will be appreciated that it is desirable to minimize the length of the Tardos code in most applications because of the increased memory and computational costs placed on the fingerprint code system by lengthy fingerprint codes. The length of a Tardos code is proportional to the square of the number of attackers, which is not extremely large. Typically, for example, the number of attackers may be between 1 and 30. However, the length of the code is still relatively large, because the square of the number of attackers is multiplied by a large constant. For a million users, the constant is roughly 4,000, hence a code that could protect against 20 attackers would take about 1.6 million (4000×20×20) points of variation in the content. Using the techniques of the present invention, as described above, the fingerprint code length can be shorter than in Tardos by about 33%. In this example, the code may be reduced from 1.6 million to slightly over a million symbols.

Another important factor in various applications of the present invention is accuracy, which is defined as the chance that an innocent user would be incriminated, or the chance that no guilty user would be found. In some embodiments of the present invention, it may be desirable to achieve a maximum accuracy even if it means a larger fingerprint code length. Hence, the present invention may be configured with the same code length as taught in Tardos, which would yield about a 5× improved accuracy over the fingerprint tracing technique taught in Tardos. Those skilled in the art will appreciate that with code lengths that are somewhere between the Tardos code length and a 33% reduction in code length, the accuracy will still be improved, but to a value less than 5× the Tardos accuracy.

Although the embodiments disclosed herein may have been discussed used in the exemplary applications where the content is software and/or DVDs, those of ordinary skill in the art will appreciate that the teachings contained herein can be apply to may other kinds of content and systems for managing access to content. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

While the preferred embodiment of the present invention has been described in detail, it will be understood that modifications and adaptations to the embodiments shown may occur to one of ordinary skill in the art without departing from the scope of the present invention as set forth in the following claims. Thus, the scope of this invention is to be construed according to the appended claims and not limited by the specific details disclosed in the exemplary embodiments.

I claim:

1. A computer implemented method for identifying the source of an unauthorized copy of content comprising:
   computer instructions being executed on a computer system by a processor that takes the actions of:
   embedding a unique user fingerprint code to into each of a plurality of authorized copies of content, said unique user fingerprint code being a Tardos fingerprint code;

determining a Tardos threshold;

identifying an unknown fingerprint code in an unauthorized copy of said content, said user fingerprint code comprising a binary string of zeros and ones;

comparing each member of said unknown fingerprint code to each corresponding member in each of said user fingerprint codes and for each position in said string, determining if both said unknown fingerprint code and said user fingerprint code have ones or zeros in said each position;

assigning a score to each of said user fingerprint codes based on said comparison, said assigning including:

for each said position of said unknown fingerprint code, adding to said score when said unknown fingerprint code and user fingerprint code match and subtracting from said score when said unknown fingerprint code and said user fingerprint code do not match;

for each position in said unknown and said user fingerprint codes, if the value of said unknown fingerprint code is one and if the value of said user fingerprint code is one, set said score equal to the sum of said score and the square root of the quotient of 1 minus a probability for said position and said probability for said position, and if the value of said unknown fingerprint code is one and if the value of said user fingerprint code is zero, set said score equal to the difference between said score and the square root of the quotient of a probability for said position and one minus said probability for said position;

for each position in said unknown and said user fingerprint codes, if the value of said unknown fingerprint code is zero and if the value of said user fingerprint code is zero, set said score equal to the sum of said score and the square root of the quotient of a probability for said position and one minus said probability for said position, and if the value of said unknown fingerprint code is zero and if the value of said user fingerprint code is one, set said score equal to the difference between said score and the square root of the quotient of one minus said probability for said position and said probability for said position;

determining which of said scores exceeds a threshold, said threshold being at least 1.33 times said Tardos threshold, wherein said Tardos threshold is equal to 20 ck, where c is the number of colluding attackers, where k=[log(1/$\epsilon$)] and where $\epsilon$ is a measure of how secure said fingerprint code is against c number of colluding attackers; and identifying as a source of said unauthorized copy at least one user fingerprint code having said score determined to exceed said threshold by identifying a plurality of said user fingerprint codes having said score determined to exceed said threshold as sources of said unauthorized copy.

* * * * *